Patented Nov. 3, 1942

2,300,592

UNITED STATES PATENT OFFICE 2,300,592

METHOD OF IMPROVING THE ADHESION OF RUBBER TO COTTON

Edward G. Partridge, Stow, Ohio, assignor to The B. F. Goodrich Company, New York, N. Y., a corporation of New York No Drawing. Application September 14, 1939, Serial No. 294,933

3 Claims. (Cl. 154—2)

This invention relates to the adhesion of rubber to cotton in the form of cords, fabrics, and the like.

The length of service of many articles of commerce embodying cotton and rubber such as tires and belts, for instance, is largely dependent upon the degree of adhesion between the rubber and the cotton. It is the principal object of this invention, accordingly, to provide a method whereby the adhesion between rubber and cotton may be increased.

Rubber ordinarily adheres rather poorly to cotton, the adhesion being due mainly to mechanical interlocking of the cotton fibers and the rubber rather than to any true adhesive bond between the cotton and the rubber. By the method of this invention, cotton is subjected to a treatment which permits adhesive bonding between rubber and cotton.

I have discovered that the adhesion of cotton to rubber is increased by applying to the cotton a dispersion of a vulcanizable rubber composition containing pectin, associating the treated cotton with vulcanizable rubber, and vulcanizing the assemblage by heating under pressure.

The vulcanizable rubber dispersion may be any of the conventional natural or artificial dispersions of rubber containing vulcanizing agents and accelerators, which compositions are well known to the art. The pectin may be included in the dispersion in any desired small proportion, 10 parts pectin to 100 parts of rubber being ordinarily satisfactory although it will be understood that greater or less proportions may be employed depending on the particular rubber compositions involved and the degree of adhesion desired. It is usually desirable, though not essential, to include a wetting agent in the dispersion to assist in the penetration of the cotton by the dispersion. The synthetic saponaceous penetrants such as the alkali metal salts of sulfated fatty acid esters, of sulfated fatty acid amides, of sulfated fatty alcohols, and of mono- and di-alkyl substituted aromatic sulfonates, and which are sold under trade names such as Nekal, Tergitol, Aquarex, and Dispersaid, are particularly useful wetting agents in the practice of this invention.

The dispersion may be applied to the cotton fibers by any desired means, although dipping the cotton in the dispersion is the method now preferred. The treated cotton is then dried without vulcanizing the coating and incorporated into rubber articles prior to vulcanization in the manners well known to the art.

As a specific embodiment of this invention, square woven cotton fabric was dipped in the following dispersion of a pectin-containing vulcanizable rubber composition:

| | | |
|---|---|---|
| Latex (60% solids) | grams | 150.0 |
| Zinc oxide | do | 4.5 |
| Zinc oleate | do | 4.5 |
| 2-mercaptobenzothiazole | do | 3.0 |
| Polybutylidene-aniline | do | 3.0 |
| Sulfur | do | 1.5 |
| Aldol-alpha-naphthylamine | do | 4.5 |
| Pectin | do | 15.0 |
| Dispersaid A | do | 3.0 |
| Water | liters | 15 |

The treated fabric was dried without vulcanizing the rubber and coated with a tire carcass stock. Two plies were superposed and vulcanized under pressure in a heated mold together with similar structures made with fabric treated with the above dispersion containing no pectin. When it was attempted to separate the plies, it was found that a 10% improvement in adhesion was obtained by incorporating pectin in the dispersion.

Although I have herein disclosed a specific example of the method of my invention, I do not intend that the invention be limited solely thereto, for it will be obvious to those skilled in the art that many variations and modifications are within the spirit and scope of the invention as defined in the appended claims.

I claim:

1. The method of improving the adhesion of rubber to cotton cord which comprises applying to the cord a dispersion of a vulcanizable rubber composition containing pectin, drying the treated cord, bringing the treated cord in contact with vulcanizable rubber while the coating is still unvulcanized, and vulcanizing the assemblage by heating under pressure.

2. The method of improving the adhesion of rubber to cotton which comprises applying to the cotton a dispersion of a vulcanizable rubber composition containing pectin, drying the treated cotton, bringing the treated cotton in contact with a solid vulcanizable rubber composition while the coating is still unvulcanized, and vulcanizing the assemblage by heating under pressure.

3. An article of manufacture comprising vulcanized rubber free from pectin, and cotton, and a layer of vulcanized rubber containing pectin deposited from an aqueous dispersion of rubber and pectin uniting the cotton to the rubber free from pectin.

EDWARD G. PARTRIDGE.